(12) United States Patent
Roy et al.

(10) Patent No.: US 9,928,021 B2
(45) Date of Patent: Mar. 27, 2018

(54) DYNAMIC SELECTION OF CONTENT FOR DISPLAY ON A SECONDARY DISPLAY DEVICE

(71) Applicant: QUALCOMM Incorporated, San Diego, CA (US)

(72) Inventors: Vinay Krishna Roy, Telengana (IN); Sreeja Nair, Maharashtra (IN); Radhika Ranjan Soni, Maharashtra (IN)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 14/586,216

(22) Filed: Dec. 30, 2014

(65) Prior Publication Data

US 2016/0189335 A1    Jun. 30, 2016

(51) Int. Cl.
G09G 5/36      (2006.01)
G06F 3/14      (2006.01)
G09G 5/395     (2006.01)

(52) U.S. Cl.
CPC .......... *G06F 3/1423* (2013.01); *G09G 5/395* (2013.01); *G09G 2360/08* (2013.01); *G09G 2370/022* (2013.01)

(58) Field of Classification Search
CPC ..... G09G 5/377; G06F 3/1423; G06F 3/1454; G06F 1/1616; G06F 1/1647; G06F 17/30554; G06F 1/1677; G06T 1/60; G06T 11/40; G06T 19/006; H04N 5/2624; H04N 1/00209; G02B 27/2278; H04L 12/2818

USPC .......................................................... 345/545
See application file for complete search history.

(56) References Cited

U.S. PATENT DOCUMENTS

| | | | |
|---|---|---|---|
| 8,171,423 B2 | 5/2012 | Olsen | |
| 8,612,518 B2 | 12/2013 | Wu et al. | |
| 2004/0075623 A1* | 4/2004 | Hartman | G09G 5/397 345/1.3 |
| 2006/0242676 A1* | 10/2006 | Hoshino | H04N 7/24 725/105 |
| 2011/0007084 A1* | 1/2011 | Park | G06F 3/1423 345/549 |
| 2012/0038541 A1 | 2/2012 | Song et al. | |
| 2012/0081353 A1 | 4/2012 | Yusupov et al. | |
| 2014/0101535 A1* | 4/2014 | Kim | G06F 3/1431 715/234 |
| 2014/0106726 A1 | 4/2014 | Crosbie et al. | |
| 2014/0184628 A1* | 7/2014 | Lee | G06F 3/1423 345/545 |

\* cited by examiner

*Primary Examiner* — Gregory J Tryder
*Assistant Examiner* — Kwang Lee
(74) *Attorney, Agent, or Firm* — Haynes and Boone, LLP

(57) ABSTRACT

An example method of dynamically selecting content to display on a secondary display coupled to a user device includes allocating, at a kernel, a first frame buffer for content to be output to a primary display. The method also includes receiving a set of image layers. The method further includes allocating, at the kernel when the set includes one or more image layers to be displayed only on the primary display, a second frame buffer for content to be output to the secondary display.

20 Claims, 5 Drawing Sheets

DYNAMIC SELECTION OF CONTENT FOR DISPLAY ON A SECONDARY DISPLAY DEVICE

FIELD OF DISCLOSURE

The present disclosure generally relates to displaying content, and more particularly to dynamically selecting content for display on an external display device while allowing the content to be displayed on a primary display device.

BACKGROUND

A user's device may be used to give a presentation to an audience. In an example, the user device may be a laptop that has its own primary display and that may also be coupled to a secondary display on which slides of the presentation may be displayed. The secondary display may be used because it is bigger than the primary display.

The user device may be in a viewing mode in which the entire content of the primary display is copied to and displayed on the secondary display. Accordingly, if the user receives an e-mail notification on her laptop, the e-mail notification may also be displayed on the secondary display so that others can view the notification. This may have undesirable consequences because if user's private information is compromised.

BRIEF SUMMARY

This disclosure relates to dynamically switching a user device between a mirrored viewing mode and a dual viewing mode. Methods, systems, and techniques for dynamically selecting content to display on a display device coupled to the user device are provided.

According to an embodiment, a method of dynamically selecting content to display on a secondary display coupled to a user device includes allocating, at a kernel, a first frame buffer for content to be output to a primary display. The method also includes receiving a set of image layers. The method further includes allocating, at the kernel when the set includes one or more image layers to be displayed only on the primary display, a second frame buffer for content to be output to the secondary display.

According to an embodiment, a system for dynamically selecting content to display on a secondary display coupled to a user device includes a display manager that receives a set of image layers from an application. The display manager sets a display attribute in the set of image layers to a first value when the set includes one or more image layers to be displayed only on the primary display. The system also includes a kernel that allocates a first frame buffer for content to be output to a primary display. The kernel allocates a second frame buffer for content to be output to the secondary display when the set includes one or more image layers to be displayed only on the primary display.

According to an embodiment, a computer readable medium has stored thereon computer-executable instructions for performing operations including: allocating a first frame buffer for content to be output to a primary display; receiving a set of image layers; and allocating a second frame buffer for content to be output to the secondary display when the set includes one or more image layers to be displayed only on the primary display.

According to an embodiment, an apparatus for dynamically selecting content to display on a secondary display coupled to a user device includes means for allocating a first frame buffer for content to be output to a primary display; means for receiving a set of image layers; and means for allocating a second frame buffer for content to be output to the secondary display when the set includes one or more image layers to be displayed only on the primary display.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

Figure 1:
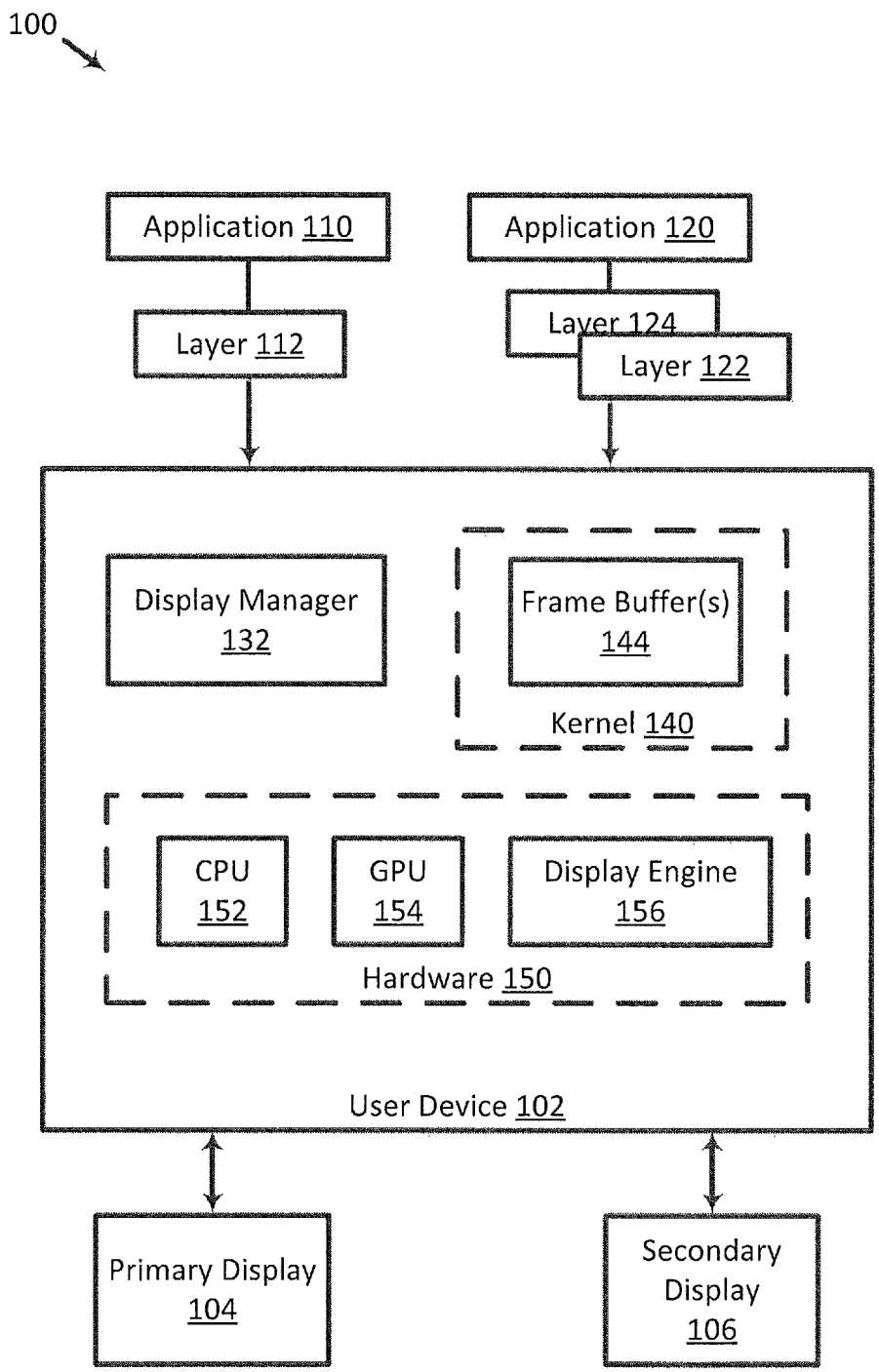
FIG. 1 is a block diagram illustrating a system for dynamically selecting content to display on a secondary display coupled to a user device, according to some embodiments.

I. Overview
II. Example System Architecture
III. Dynamically Switch between Mirrored Viewing Mode and Dual Viewing Mode
   A. Mirrored Viewing Mode
   B. Dual Viewing Mode
IV. Example Method
V. Example Computing Device I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A user device may be coupled to a primary display and a secondary display. Content may be displayed on the primary and secondary displays. In an example, a user may use her device as an information source that is coupled to the secondary display for presenting to an audience. The secondary display may be used because it is bigger than the primary display. In an example, the secondary display may be a television or a screen projector.

The user device may be in one of various viewing modes. For example, the user device may be in a mirrored viewing mode in which the entire content of the primary display is copied to and displayed on the secondary display. Alternatively, the user device may be in a dual viewing mode in which the viewing area of the primary display and the secondary display are different. Accordingly, the content that is displayed on the primary display may be different from the content that is displayed on the secondary display. For example, a video may play on the primary display while a power point presentation (and no content from the video) is displayed on the secondary display.

If the user device is a smartphone or a tablet, the user may receive a telephone call or text message while the user device is in the mirrored viewing mode. When the incoming call or text message is received, private information (e.g., the caller's telephone number, caller's identity, or actual text message) may be displayed on the primary display as well as the secondary display. Thus, an audience watching the presentation may be able to view private information personal to the user. Calls or message notifications may contain private information causing a potential privacy violation if viewed by others. Thus, it may be undesirable for some content that is displayed on the primary display to be displayed on the secondary display. The present invention provides techniques to maintain the user's private information and prevent it from being displayed on the secondary display.

Additionally, if an audience is watching the presentation (e.g., video presentation) on the secondary display, pausing the presentation to answer incoming calls or respond to text messages may be undesirable. The present disclosure also provides techniques to seamlessly switch between the mirrored viewing mode and the dual viewing mode without user intervention. Accordingly, other viewers watching the presentation on the secondary display may continue to watch it while the user answers the incoming call, reads the text message, or responds to the text message.

In an embodiment, a method of dynamically selecting content to display on a secondary display coupled to a user device includes allocating, at a kernel, a first frame buffer for a primary display. Content stored in the first frame buffer is output to the primary display. The method also includes receiving a set of image layers. The method further includes allocating a second frame buffer for the secondary display when the set of image layers is to be displayed only on the primary display. Content stored in the second frame buffer is output to the secondary display.

II. Example System Architecture

FIG. 1 is a block diagram illustrating a system 100 for dynamically selecting content to display on a secondary display coupled to a user device, according to some embodiments. System 100 includes a user device 102 that is coupled to a primary display 104 and a secondary display 106. User device 102 may be, but is not limited to, a mobile device (e.g., smartphone, tablet, personal digital assistant (PDA), or laptop, etc.), stationary device (e.g., personal computer, workstation, etc.), game console, set-top box, kiosk, embedded system, or other device having at least one processor and memory.

User device 102 may be coupled to primary display 104 and/or secondary display 106 via a wireless (e.g., Wi-Fi connection, CMI, etc.) or wired communications link. Primary display 104 and secondary display 106 are physical display devices that display data processed by user device 102. A physical display device may be, for example, a Liquid-Crystal Display (LCD), High-Definition Multimedia Interface (HDMI) device, a monitor, a television, a projection device, a plasma display panel, a light emitting diode (LED) array, a cathode ray tube (CRT) display, electronic paper, a surface-conduction electron-emitted display (SED), a laser television display, a nanocrystal display or another type of display unit. It will be appreciated that other wireless and wired communication links, and other physical display devices are contemplated, and that the various types named herein are not limiting.

In an example, primary display 104 is part of, and integrated into, user device 102 (e.g., a screen of user device 102). Primary display 104 may be sold with and attached to user device 102 such that when a user views content via the user device, the content is displayed on primary display 104. Secondary display 106 may be a display (e.g., HDMI display attached via a port) external to user device 102 and may be a stand-alone device coupled to user device 102. Secondary display 106 may also be used as a display for other devices.

User device 102 may receive data from applications and process the data accordingly. In an example, an application may "draw" content on a display device (e.g., primary display 104 or secondary display 106) coupled to the user device. A layer is an application buffer containing primitives for display on one or more display devices coupled to user device 102. In an example, a layer is an audio layer that is output via speakers coupled to user device 102. The audio layer may be audio data from an application, and one or more audio layers may be composited into one audio buffer. The content stored in the audio buffer is pushed to the speakers for audibility by the user and others.

In another example, a layer is an image layer that is displayed on one or more display devices coupled to user device 102. The image layer may be a viewing area on the display device, and one or more image layers may be composited into one frame that is stored in a frame buffer. The content stored in the single frame buffer is pushed onto the display device for viewing by the user and others. Although the examples below may describe a layer as being an image layer, this is not intended to be limiting and the discussion applies as well to audio layers that may be separated and stored in separate audio buffers that are output to speakers coupled to the secondary display.

For simplicity and brevity, two display devices are illustrated as being coupled to user device 102. This is not intended to be limiting, and it should be understood that user device 102 may be coupled to more than two display devices. Additionally, application 110 and/or application 120 may be installed on user device 102, or may be a remote application that is not installed on user device 102 and that sends image layers to user device 102 via a network.

In the example illustrated in FIG. 1, application 110 sends a layer 112 to user device 102, and application 120 sends layers 122 and 124 to user device 102. Layers 112, 122, and 124 may be for display on a single frame. On one or more display devices coupled to user device 102, application 110 may draw a first image represented by layer 112 and application 120 may draw two images represented by layers 122 and 124. In an example, layer 112 may be an image of the current time, layer 122 may be an image of a taskbar (showing battery information and network strength of user device 102), and layer 124 may be an image of blue wallpaper. These three image layers may be instantiated as application buffers containing three-dimensional and/or two-dimensional primitives and may be composited into one frame that is displayed on a display device. In the frame, the current time, taskbar, and blue wallpaper may be all displayed.

User device 102 includes a display manager 132 that detects incoming image layers from applications. Each image layer may be allocated a memory area in the kernel and may be represented by a data structure. Each data structure representative of an image layer may include different parameters stored into it. Example parameters include the primitive type(s) in the image layer, a location at which the image layer will be displayed on the display device, height and width attributes indicating the image layer's viewing area dimensions relative to the display device, and a display attribute indicating one or more display devices on which the image layer should or should not be displayed.

In an embodiment, the display attribute is a flag indicating whether the image layer is to be displayed only on the primary display. For example, the image layer is to be displayed only on the primary display when a variable "privacy" in the image layer is set, and the image layer is to be displayed on other display devices aside from the primary display (e.g., on secondary display 106) when the variable "privacy" is cleared. In another example, the display attribute is a flag indicating whether the image layer is to be displayed on one or more display devices aside from the primary display. A data structure representative of the image layer may include a variable "forPublicEyes." The image layer may then be displayed only on the primary display when "forPublicEyes" is cleared, and displayed on other display devices aside from the primary display when "forPublicEyes" is set.

In an embodiment, the flag is a Boolean type. In some embodiments, a data structure representative of an image layer has a string attribute "privacy" having a value "Yes" if the image layer is private and is to be displayed only on the primary display, and a value "No" if the image layer is not private and is to be displayed on one or more display devices aside from the primary display. Accordingly, display manager 132 controls, based on how it marks the incoming image layers, the content displayed on the display devices and thus controls what viewers are able to see on the display devices.

In some embodiments, display manager 132 is responsible for providing an indication to a kernel 140 to allocate one or more frame buffers 144 for the incoming image layers. In an example, kernel 140 is a LINUX® kernel that provides a block of memory suitable for output to a visual display device. Trademarks are the property of their respective owners. A frame buffer is a standard component of a kernel (e.g., LINUX® kernel) and is a contiguous block of memory allocated in a PMEM region. The memory may be allocated to be twice the size or more of a display device (e.g., LCD or HDMI device) to provide front and back frame buffers. Contents of the front frame buffer are visible on the display device, while the back frame buffer holds the next frame to be drawn. CPU 152 and/or GPU 154 may store rendered image data in frame buffer 144, which is allocated within system memory. A portion of application 110 may execute on CPU 152 and store the image data (e.g., texel colors, width, height, and color depth) in the system memory.

The central processing unit (CPU) 152, graphics processing unit (GPU) 154, and a display engine 156 may be included by hardware 150 of the user device 102. Display engine 156 may be hardware (e.g., a graphics card or a multimedia display processor (MDP)) that composites one or more image layers into one or more frame buffers. Display engine 156 allocates frame buffer(s) 114 within system memory based on requests from kernel 140, and stores image layers therein. Display engine 156 also pushes pixels out from the frame buffer memory to a physical display device.

Additionally, display engine 156 may support overlay, scale, rotation, and/or bit-boundary block transfer—bit blit—operations, in which pixel codes from a frame buffer are transferred to another frame buffer. Bit blitting is a highly optimized transfer of a block of data from one location to another. For example, pixel codes may be transferred from the back frame buffer to the front frame buffer, or from one location to another location in the same frame buffer. Bit blitting generally may be used in graphics operations to transfer image data from main memory, where the graphics code is processing the image data, to the graphics memory from which the image will be displayed on a screen. In particular, bit Witting may be implemented at the hardware level of CPU 152 or GPU 154. In another example, a bit blit operation is a graphics operation in which several bitmaps are combined into one bitmap using a raster operator. The bit blit operation may involve a source bitmap, a destination bitmap, a "mask" bitmap, and/or a "stencil" bitmap. The pixels of the source, mask, and/or stencil bitmaps are combined bitwise according to the specified raster operation, and the result is written into the destination bitmap.

CPU 152 may execute program instructions and may issue one or more graphics rendering commands to GPU 154 to perform some or all of the rendering of the image layers. GPU 154 may be included in display engine 156 and cause the image layers to be rendered on one or more display devices. The graphics data may include a list of graphics primitives, e.g., points, lines, triangles, quadrilaterals, triangle strips, etc. GPU 154 may perform graphics operations to render one or more graphics primitives to primary display 104 or secondary display 106. GPU 154 may, in some instances, be built with a highly-parallel structure that provides more efficient processing of vector operations than CPU 152. For example, GPU 154 may include a plurality of processing units that are configured to operate on multiple vertices, control points, pixels and/or other data in a parallel manner. Such a highly parallel nature of GPU 154 may, in some instances, allow GPU 154 to render graphics images (e.g., GUIs and two-dimensional (2D) and/or three-dimensional (3D) graphics scenes) onto a display device more quickly than rendering the images using CPU 152. In addition, the highly parallel nature of GPU 154 may allow GPU 154 to process certain types of vector and matrix operations for general-purposed computing applications more quickly than CPU 152.

III. Dynamically Switch between Mirrored Viewing Mode and Dual Viewing Mode

A. Mirrored Viewing Mode

Figure 2:
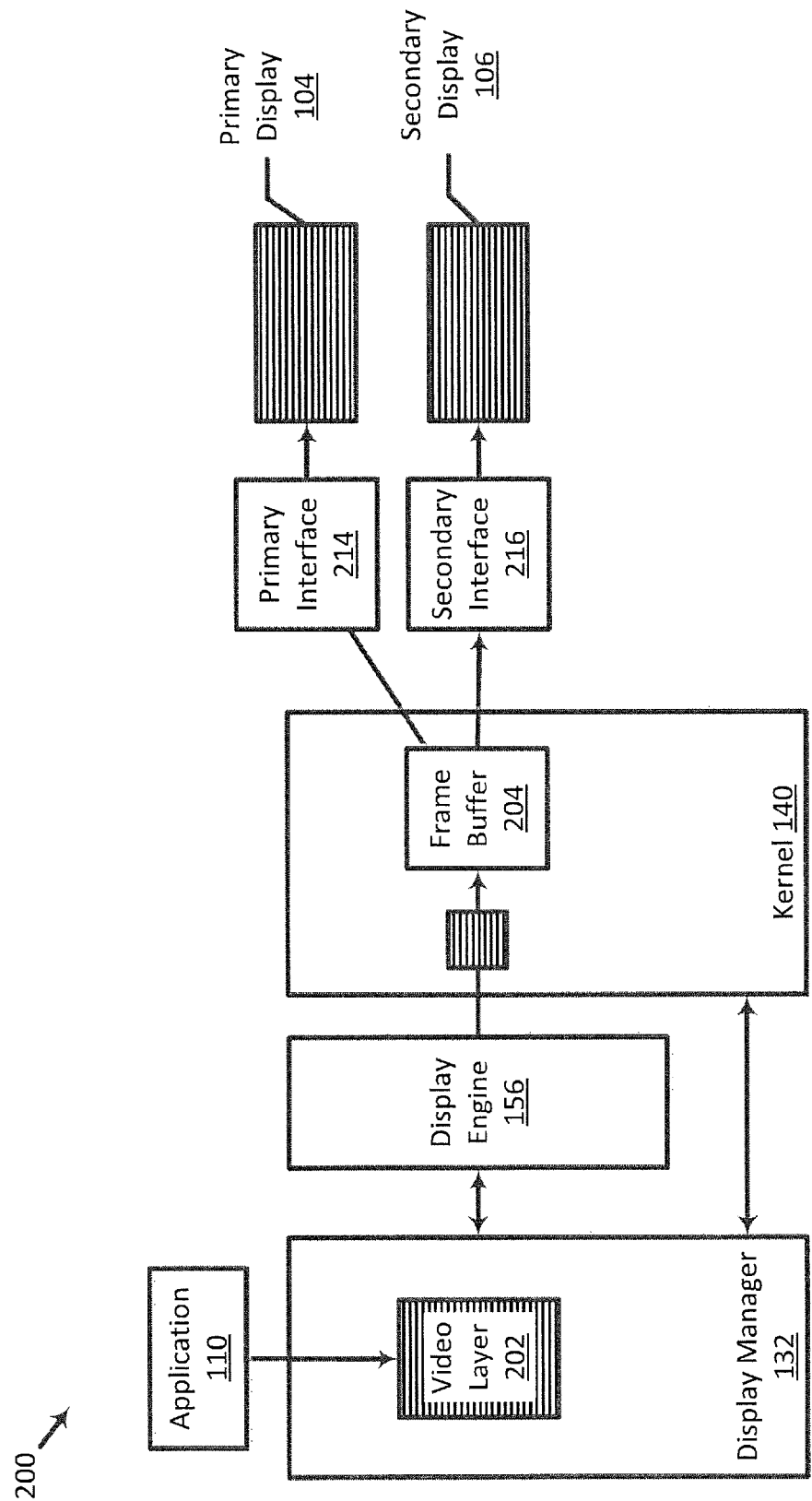
FIG. 2 is an example block diagram illustrating content that is displayed on primary and secondary displays while the user device is in the mirrored viewing mode, according to some embodiments.

FIG. 2 is an example block diagram illustrating a way for content to be displayed on primary display 104 and secondary display 106 while user device 102 is in the mirrored viewing mode, according to some embodiments. Applications may send a set of one or more image layers for display on one or more display devices. Display manager 132 may detect a set of incoming image layers from an application and determine whether the set should be displayed only on primary display 104. Multiple applications may send a different set of image layers to user device 102.

The set of image layers should be displayed only on primary display 104 when the application is of a particular type. In an example, application 110 is a communication application enabling a user of a user device to communicate with a user of another user device. It may be desirable to recognize when communication applications send image layers because the content that they display may be confidential information that the user prefers to remain private and not displayed to an audience on secondary display 106. For example, an SMS communication application may cause to be displayed on secondary display 106 a text message that the user may prefer not to be showcased to an audience. In another example, an e-mail application may cause to be displayed on secondary display 106 an e-mail message notification that the user may prefer not to be showcased to the audience. The notification may include the first couple of lines in the e-mail message.

In the example illustrated in FIG. 2, application 110 sends a set of image layers including a video layer 202 to display manager 132. Display manager 132 may determine whether application 110 is a communication application. Display manager 132 may recognize that such an application is a communication application in a variety of ways. In some embodiments, display manager 132 accesses a whitelist including one or more communication applications (e.g., messaging application, Voice over IP (VOIP) application, etc.). The user may register applications as being communication applications. The user may also download the whitelist of applications from a website that provides information on popular communication applications. In another example, an application registers itself with the whitelist. For example, the application may register itself with the whitelist in response to being installed on user device 102. Registered applications are included in the whitelist, and image layers received from any of the registered applications are to be displayed only on primary display 104. Additionally, the whitelist may include applications that are categorized into various categories. For example, a VOIP application may be registered as a VOIP application and a Short Message Service (SMS) application may be registered as an SMS application.

The use of a whitelist may be undesirable to some users. Alternatively, to determine whether an application is a communication application, display manager 132 may identify a protocol by which the application abides and determine whether the protocol is a communication protocol. Display manager 132 may determine the in-built communication protocols (e.g., telephone application) of user device 102. If the protocol is a communication protocol, the application that sent the set of image layers is a communication application. If none of the protocols by which the application abides is a communication protocol, the application is not a communication application.

Display manager 132 may mark each image layer to indicate whether the image layer is a private layer that should not be displayed on a display device other than primary display 104. In an example, display manager 132 may mark video layer 202 for display only on primary display 104 when video layer 202 is sent from a communication application. Additionally, display manager 132 may mark video layer 202 for display on display devices other than or in addition to primary display 104 (e.g., secondary display 106) when video layer 202 is not sent from a communication application.

Display manager 132 may mark an image layer in various ways. As discussed, an image layer may be represented by a data structure that is passed to display engine 156 or kernel 140. Information (e.g., flags) may be added to the data structure to provide an indication to kernel 140 that the image layer is to be displayed only on primary display 104, or on display devices other than or in addition to primary display 104. For example, display manager 132 may mark an image layer by setting a display attribute value (e.g., variable) in the image layer to indicate whether the image layer is to be displayed only on primary display 104, or on display devices other than or in addition to primary display 104.

Accordingly, as image layers are received for display on a display device from one or more applications, display manager 132 may dynamically determine which content should be displayed only on primary display 104 (e.g., private information), and which content should be displayed on both primary display 104 and secondary display 106. As such, if an image layer is from a communication application, display manager 132 may dynamically determine that the image layer is to be displayed only on primary display 104 to prevent viewers from seeing the image layer on secondary display 106. By contrast, if an image layer is not from a communication application, display manager 132 may dynamically determine that the image layer is not private and may be displayed on both primary display 104 and secondary display 106.

Once this determination is made, display manager 132 may set a display attribute for the image layer accordingly and pass video layer 202 to kernel 140. Kernel 140 receives video layer 202 and allocates one or more frame buffers for display on primary display 104 and/or secondary display 106 according to the display attribute for the image layer, In an example, application 110 is not a communication application, and display manager 132 marks video layer 202 as a non-private image layer for display on both primary display 104 and secondary display 106. Kernel 140 reads the display attribute of video layer 202 and sends a request to display engine 156 to allocate frame buffer 204 and composite one or more image layers into it. In the example illustrated in FIG. 2, kernel 140 may send video layer 202 to display engine 156, and display engine 156 may copy video layer 202. The dimensions of video layer 202 may comprehend the entire size of primary display 104 and secondary display 106. Frame buffer 204 stores a frame including video layer 202, and content stored in frame buffer 204 is output to both primary display 104 and secondary display 106 for viewing.

A primary interface 214 may be coupled to frame buffer 204 and primary display 104, and a secondary interface 216 may be coupled to frame buffer 204 and secondary display 106. In some examples, a display interface (e.g., primary interface 214 or secondary interface 216) may include a digital-to-analog converter (DAC) to convert digital values retrieved from a frame buffer into an analog signal consumable by the corresponding display device (e.g., primary display 104 or secondary display 106). In other examples, the display interface may pass the digital values directly to the display device for processing. Primary interface 214 may retrieve the image data from frame buffer 204 and configure primary display 104 to display the image layers stored in the frame buffer. Likewise, secondary interface 216 may retrieve the image data from frame buffer 204 and configure secondary display 106 to display the image layers stored in the frame buffer.

In the example illustrated in FIG. 2, one image layer (e.g., video layer 202) is received from application 110 for display on a display device. However, an application may send a plurality of image layers for display in a single frame. In that case, kernel 140 may send the plurality of image layers to display engine 156 for composition. Display engine 156 may do this by copying the plurality of image layers according to the height and width of each into frame buffer 204. The frame buffer stores a frame that is to be displayed on one or more display devices. Each frame includes one or more viewing areas, where each viewing area corresponds to an image layer that is received from an application.

In FIG. 2, user device 102 may be in the mirrored viewing mode in which image layers that are displayed on primary display 104 are also displayed on secondary display 106. While application 110 sends a set of image layers for display in a frame to user device 102, user device 102 may also receive another set of image layers for the same frame. For example, user device 102 may receive an SMS message, an e-mail message set up to pop up on the display, or an incoming telephone call. For privacy concerns, it may be desirable to avoid displaying any information regarding these communications on secondary display 106.

B. Dual Viewing Mode

If an incoming layer is from a communication application, display manager 132 and kernel 140 may work together to dynamically switch user device 102 from the mirrored viewing mode to the dual viewing mode. To initiate the switch to the dual viewing mode, display manager 132 may mark an image layer for display only on the primary display 104 by setting a display attribute in the image layer to a first value. Similarly, display manager 132 may mark the image layer as a non-private image layer for display on both primary display 104 and secondary display 106 by setting the display attribute in the image layer to a second value different from the first value.

When kernel 140 receives the image layer marked as private for display only on primary display 104, kernel 140 dynamically switches user device 102 from the mirrored viewing mode to the dual viewing mode by allocating a separate frame buffer for secondary display 106. Content stored in the separate frame buffer does not include any private image layers and is output to secondary display 106.

Figure 3:
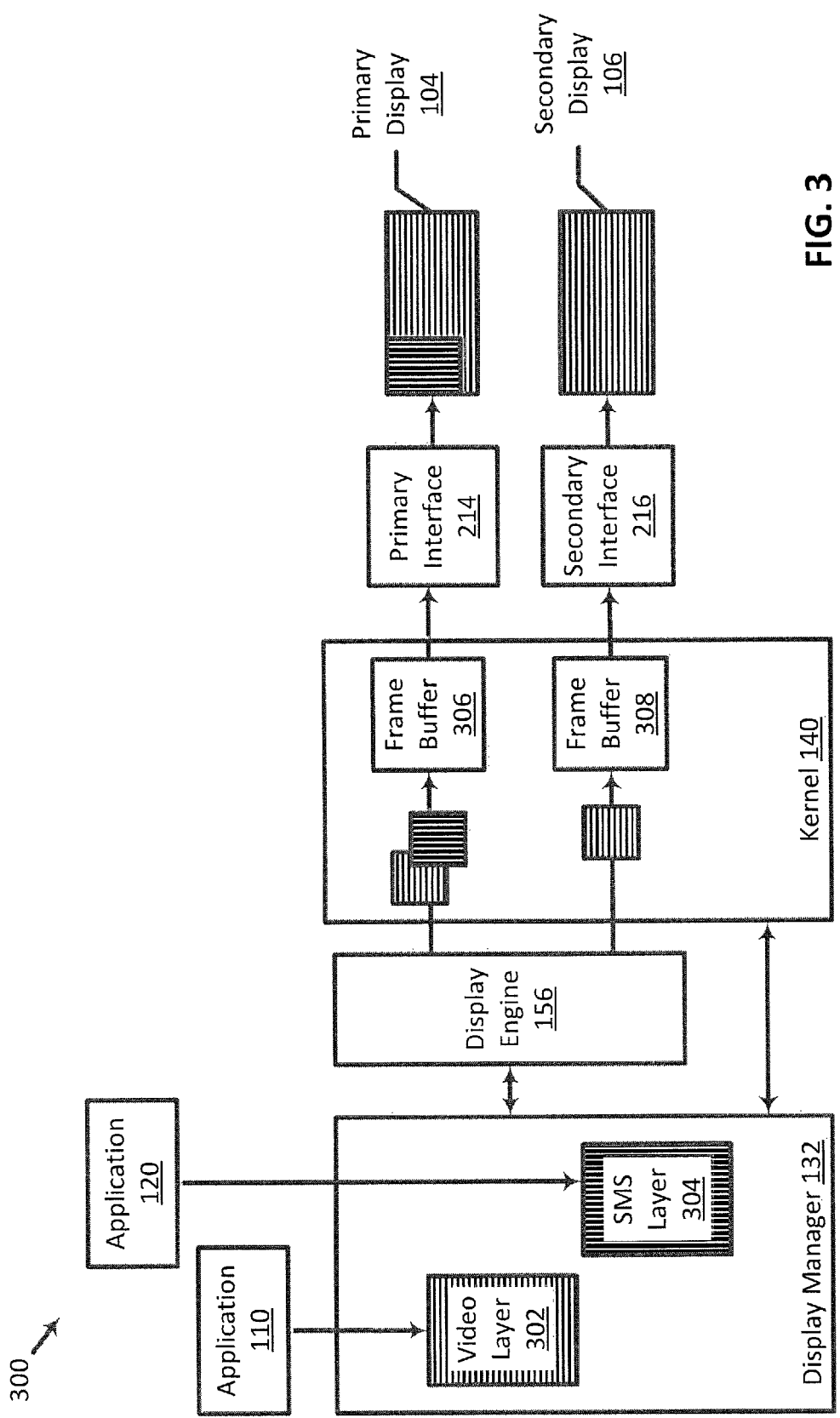
FIG. 3 is an example block diagram illustrating content that is displayed on primary and secondary displays while the user device is in the dual viewing mode, according to some embodiments.

FIG. 3 is a block diagram 300 illustrating an example according to some embodiments in which content is displayed on primary display 104 and secondary display 106 while user device 102 is in the dual viewing mode. In this example, different viewing areas are displayed on primary display 104 and secondary display 106. Primary display 104 has one or more viewing areas, whereas secondary display 106 has one because a private image layer corresponding to a viewing area displayed on primary display 104 is not displayed on secondary display 106. If any image layers are marked for display only on primary display 104, kernel 140 allocates two different frame buffers (e.g., frame buffer 306 and frame buffer 308). Frame buffer 306 is allocated to store the non-private and private image layers for display on primary display 104, and a frame buffer 308 is allocated to store the non-private image layers for display on secondary display 106. If any image layers are marked for display only on primary display 104, kernel 140 allocates two different frame buffers (e.g., frame buffer 306 and frame buffer 308). Frame buffer 306 is allocated to store the non-private and private image layers for display on primary display 104, and a frame buffer 308 is allocated to store the non-private image layers for display on secondary display 106.

In an example, display manager 132 receives an incoming video layer 302 from application 110 and an incoming SMS layer 304 from application 120. Display manager 132 may detect whether the incoming image layers are from applications of a particular type. For example, a particular type of application is a communication application. Display manager 132 may therefore determine that application 110 is not a communication application and that application 120 is a communication application.

In an example, video layer 302 is not sent from a communication application, and display manager 132 may mark video layer 302 for display on both primary display 104 and secondary display 106. Additionally, SMS layer 304 is sent from a communication application, and display manager 132 may mark SMS layer 304 for display only on primary display 104 to prevent SMS layer 304 from being displayed on secondary display 106.

Display manager 132 may then send video layer 302 and SMS layer 304 to kernel 140, which knows from the marks how many frame buffers to allocate. Each frame buffer may correspond to one or more display devices, and the content stored in a frame buffer is output to its corresponding one or more display devices. Kernel 140 may receive video layer 302, which is marked for display on both primary display 104 and secondary display 106, and may receive SMS layer 304, which is marked for display only on primary display 104.

Kernel 140 has the intelligence to know video layer 302 can be displayed on both primary display 104 and secondary display 106, but SMS layer 304 is to be displayed only on primary display 104. As such, kernel 140 may allocate frame buffer 306 for primary display 104 and may allocate a separate frame buffer 308 for secondary display 106. When kernel 140 reads the marked image layer for display only on the primary display, kernel 140 knows to allocate a separate frame buffer that is output to secondary display 106 (and any other secondary display devices that are coupled to user device 102). Kernel 140 allocates frame buffer 308 so that the content in this frame buffer, which is separate from frame buffer 306, can be output to secondary display 106 without concern for privacy violations.

Kernel 140 sends a request for frame buffer 306 and frame buffer 308 to display engine 156. In some embodiments, the request instructs display engine 156 to composite video layer 302 and SMS layer 304 into frame buffer 306 and copy the composited image into frame buffer 306. The request also instructs display engine 156 to copy video layer 302 into frame buffer 308. Kernel 140 may send one or more requests to display engine 156 to achieve the creation of one or more frame buffers.

Display engine 156 receives the request(s) and creates the frame buffers as requested by kernel 140. Display engine 156 may determine which layers should be copied into which frame buffers depending on the request. In some embodiments, display engine 156 copies only the image layers that are intended for a particular display device into its corresponding frame buffer. Display engine 156 composites video layer 302 and SMS layer 304 into frame buffer 306. In particular, display engine 156 determines the height and width of video layer 302 and SMS layer 304 and determines their viewing areas in a single frame for display on primary display 104, and copies video layer 302 and SMS layer 304 according to the height and width of each into frame buffer 306. Display engine 156 may copy only those image layers intended to be displayed on a particular display device into its corresponding frame buffer.

In some embodiments, kernel 140 sends a request for display engine 156 to composite incoming image layers into a frame buffer. For example, kernel 140 may send a request to display engine 156 to composite video layer 302 and SMS layer 304 into frame buffers 306 and 308. Frame buffers 306 and 308 accordingly each store a composited image including video layer 302 and SMS layer 304. Display engine 156 may remove the image layers that are marked as private image layers for display only on the primary display from frame buffer 308, which corresponds to secondary display 106 and stores content that is pushed to secondary display 106 for viewing.

After display engine 156 removes the private image layers from frame buffer 308, frame buffer 306 stores private and non-private image layers for display on primary display 104, and frame buffer 308 stores non-private image layers for display on secondary display 106. SMS layer 304 is dropped from frame buffer 308 so that privacy is ensured and SMS layer 304 is not displayed on secondary display 106. In particular, frame buffer 308 includes each of the incoming image layers except for the image layers marked as private layers (e.g., being for display only on primary display 104). As such, SMS layer 304, which is marked as a private image layer for display only on primary display 104, is removed from frame buffer 308 and not displayed on secondary display 106.

Primary interface 214 may retrieve the image data from frame buffer 306 and configure primary display 104 to display the image layers stored in the frame buffer. In FIG. 3, all of the incoming image layers for display in a frame are displayed on primary display 104. Additionally, any incoming private image layers for display in the frame are not displayed on secondary display 106. Secondary interface 216 may retrieve the data from frame buffer 308 and configure secondary display 106 to display the image layers stored in the frame buffer. Additionally, the user of user device 102 may respond to communication without it being displayed on secondary display 106. For example, the user may respond to SMS layer 304 by sending a text message back to the sender of the text message.

As discussed, display manager 132 and kernel 140 may dynamically switch user device 102 from the dual viewing mode to the mirrored viewing mode. In an example, the mirrored viewing mode may be restored once the communications (e.g., SMS message) via the communication application is completed (e.g., a text messaging string is terminated). In another example, the mirrored viewing mode may be restored once the notification (e.g., e-mail notification) expires.

As discussed above and further emphasized here, FIGS. 1-3 are merely examples, which should not unduly limit the scope of the claims. For example, although image layers have been used in some of the above examples, it should be understood that a layer sent by an application may also be an audio layer. For example, the application may send an audio stream to user device 102, which may include an audio manager (not shown) that performs functionality similar to display manager 132. If user device 102 receives an audio layer (e.g., incoming phone call) from a communications application (e.g., telephone application), the audio manager may mark the audio layers as private layers that are not to be output to speakers so that an audience can hear them. In an example, the audio manager creates audio buffers corresponding to one or more display device. An audio buffer is output to speakers coupled to the corresponding display device. Accordingly, if user device 102 is a cellular telephone, the user may answer the phone call and talk to the caller using user device 102, without having her telephone communications broadcast to the audience. The audience may continue to watch the presentation (e.g., non-private video and audio layers may be displayed) without any interruption or stutter on secondary display 106.

In an embodiment, a method of dynamically selecting audio content for output to a secondary speaker coupled to user device 102 includes allocating, at a kernel, a first audio buffer for a primary speaker coupled to user device 102. Content stored in the first audio buffer is output to the primary speaker. The method may also include receiving a set of audio layers and allocating, at the kernel, a second audio buffer for the secondary speaker when the set of audio layers is to be output only to the primary speaker. Content stored in the second audio buffer is output to the secondary speaker. Image layers may be also be received and dealt with accordingly. For example, an application may send both audio and image layers.

In some embodiments, an audio manager is included in user device 102 and receives a set of audio layers from an application. The audio manager may set an audio attribute in the set of audio layers to a first value when the set of audio layers is to be output only to a primary speaker coupled to the user device (e.g., when the application is a communication application). The audio manager may set the audio attribute to a second value when the set of audio layers is not to be output only to the primary speaker. Kernel 140 may allocate a first audio buffer for the primary speaker. Additionally, kernel 140 may allocate a second audio buffer for a secondary speaker coupled to the user device when the audio attribute is set to the first value. Content stored in the first audio buffer is output to the primary speaker, and content stored in the second audio buffer is output to the secondary speaker.

Audio manager may mark the audio layers such that the audio layers stored in the first and second audio buffers are mutually exclusive. For example, a set of layers stored in the first audio buffer is not stored in the second audio buffer, and a set of layers stored in the second audio buffer is not stored in the first audio buffer. As such, when content is output to the primary speaker, the audience does not hear the user's conversation over the user device, and the user does not hear any audio from the presentation through the speakers of the user device.

The user device may be in one of various auditory modes. For example, the user device may be in a mirrored auditory mode in which all the sets of received audio layers are output to the secondary speaker. Alternatively, the user device may be in a dual auditory mode in which one or more sets of received audio layers output to the primary speaker is/are not output to the secondary speaker. Rather, the content output to the primary speaker (e.g., the user's conversation with the other person on the line via user device 102) is different from the content output to the secondary speaker (e.g., audio for the presentation to the audience).

The audio manager and kernel 140 may dynamically switch user device 102 from the mirrored audible mode to the dual audible mode. Additionally, the audio manager and kernel 140 may dynamically switch user device 102 from the dual audible mode to the mirrored audible mode. In an example, the mirrored audible mode may be restored once the communications (e.g., phone call) via the communication application is completed (e.g., a call is terminated or rejected).

Figure 4:
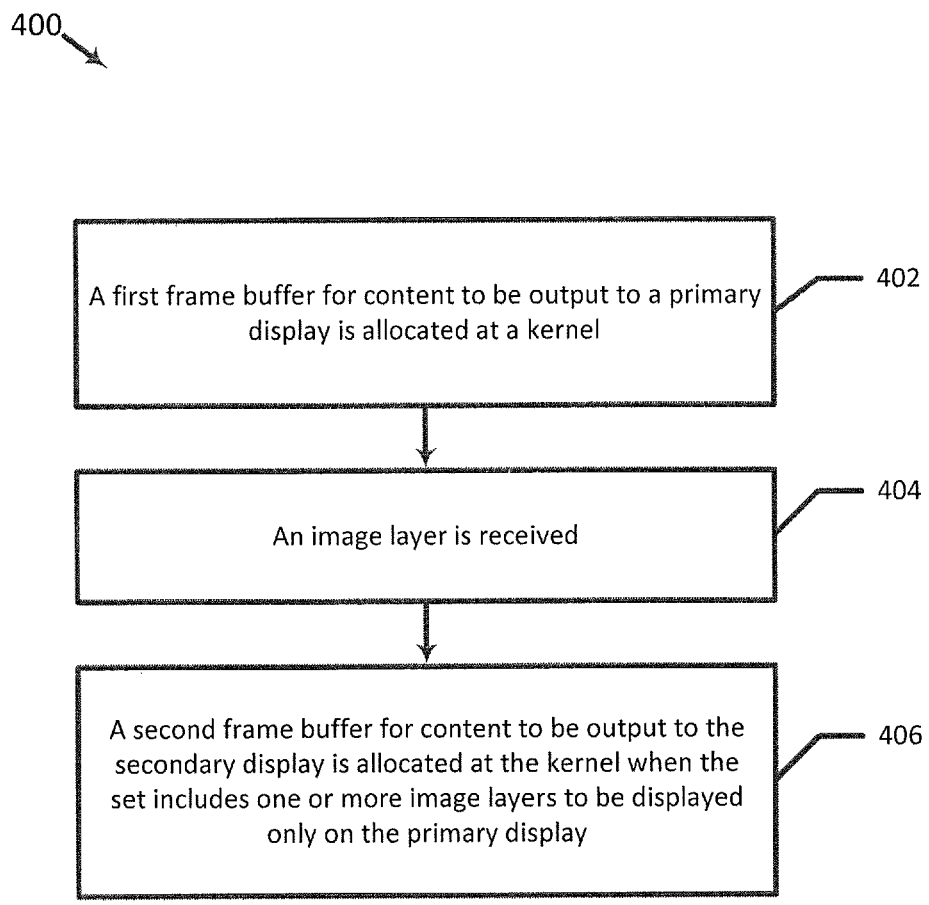
FIG. 4 is a process flow diagram of dynamically selecting content to display on a secondary display coupled to a user device, according to some embodiments.

Moreover, in FIGS. 2 and 3, two display devices are illustrated as being coupled to user device 102 and two speakers are described as being coupled to user device 102. Display manager 132 or an audio manager may mark a layer with an indication of a display device on which an image layer should be displayed or a speaker to which an audio layer should be output, respectively. For example, display manager 132 may mark an image layer for display only on a third display device (not shown). In another example, display manager 132 may mark the image layer for display only on secondary display 106 and the third display device. Similarly, the audio manager may mark an audio layer for output to a third speaker coupled to user device 102. In another example, the audio manager may mark the audio layer for display only on secondary and tertiary speakers coupled to user device 102, IV. Example Method FIG. 4 is a process flow diagram 400 of dynamically selecting content to display on a secondary display coupled to a user device, according to some embodiments. Method 400 is not meant to be limiting and may be used in other applications.

Method 400 includes blocks 402-406. In a block 402, a first frame buffer for content to be output to a primary display is allocated at a kernel. In an example, kernel 140 allocates frame buffer 306 for content to be output to primary display 104. In a block 404, a set of image layers is received. In an example, display manager 132 receives SMS layer 304. In a block 406, a second frame buffer for content to be output to the secondary display is allocated at the kernel when the set includes one or more image layers to be displayed only on the primary display. In an example, kernel 140 allocates frame buffer 308 for content to be output to secondary display 106 when SMS layer 304 is an image layer to be displayed only on primary display 104.

In some embodiments, blocks 402-406 may be performed for any number of occurrences of any number of layers received by an application. It should be understood that additional processes may be performed before, during, or after blocks 402-406 discussed above. It is also understood that one or more of the blocks of method 400 described herein may be omitted, combined, or performed in a different sequence as desired.

V. Example Computing Device

Figure 5:
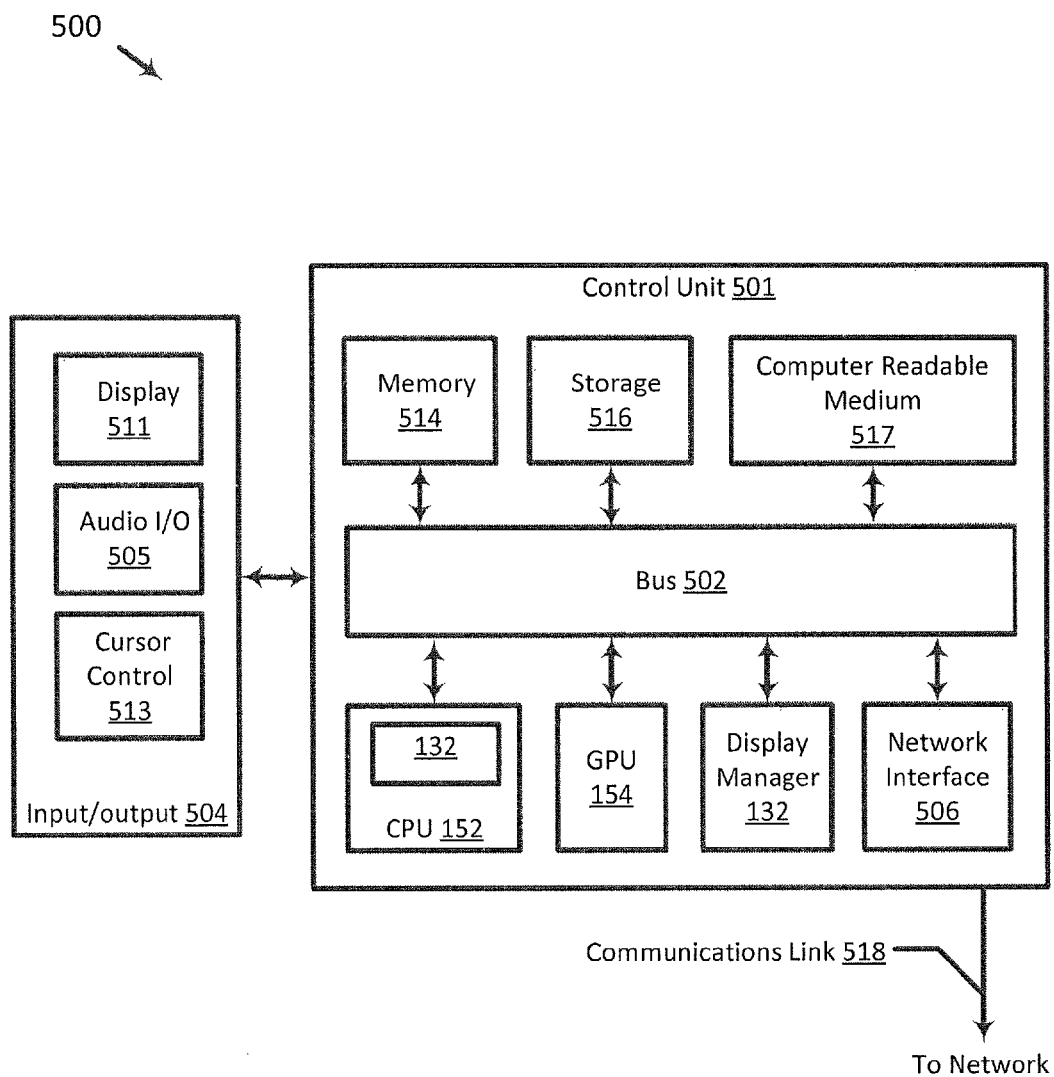
FIG. 5 is a block diagram of a computer system suitable for implementing one or more embodiments of the present disclosure.

FIG. 5 is a block diagram of an example computer system 500 suitable for implementing any of the embodiments disclosed herein. In various implementations, computer system 500 may be user device 102. Computer system 500 includes a control unit 501 coupled to an input/output (I/O) 504 component.

Control unit 501 may include one or more CPUs 152 and may additionally include one or more storage devices each selected from a group including floppy disk, flexible disk, hard disk, magnetic tape, any other magnetic medium, CD-ROM, any other optical medium, random access memory (RAM), programmable read-only memory (PROM), erasable ROM (EPROM), FLASH-EPROM, any other memory chip or cartridge, and/or any other medium from which a processor or computer is adapted to read. The one or more storage devices may include stored information that may be made available to one or more computing devices and/or computer programs (e.g., clients) coupled to computer system 500 using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Components include an input/output (I/O) component 504 for processing user actions, such as selecting keys from a keypad/keyboard or selecting one or more buttons or links, etc., and sends a corresponding signal to bus 502. I/O component 504 may also include an output component such as a display 511, and an input control such as a cursor control 513 (such as a keyboard, keypad, mouse, etc.). Display 511 may be primary display 104, secondary display 106, or another display device that is coupled to computer system 500. Image layers received from applications may be displayed on display 511.

An audio I/O component 505 may also be included to allow a user to use voice for inputting information by converting audio signals into information signals. Audio I/O component 505 may allow the user to hear audio. Audio layers received from applications may be broadcast via audio I/O component 505.

A transceiver or network interface 506 transmits and receives signals between computer system 500 and other devices via a communication link 518 to a network. In an embodiment, the transmission is wireless, although other transmission mediums and methods may also be suitable. In an example, applications may send layers (e.g., image layers or audio layers) to computer system 500 using communications link 518 or bus 502. Additionally, display 511 may be coupled to control unit 501 via communications link 518.

CPU 152, which may be a micro-controller, digital signal processor (DSP), or other processing component, processes these various signals, such as for display on display 511 of computer system 500 or transmission to other devices via communication link 518. Display manager 132 may execute in CPU 152. CPU 152 may also control transmission of information, such as cookies or IP addresses, to other devices.

Computer system 500 also includes GPU 154. CPU 152 may send a stream of commands to GPU 154 via bus 502 and cause GPU 154 to render image data stored in a frame buffer to a display device. Components of computer system 500 also include a system memory component 514 (e.g., RAM), a static storage component 516 (e.g., ROM), and/or a computer readable medium 517. In an example, display manager 132 may create frame buffers in memory 514 based on requests from kernel 140. Content in the frame buffers may be displayed on display 511.

Computer system 500 performs specific operations by CPU 152 and other components by executing one or more sequences of instructions contained in system memory component 514. Logic may be encoded in computer readable medium 517, which may refer to any medium that participates in providing instructions to CPU 152 for execution. Such a medium may take many forms, including but not limited to, non-volatile media, volatile media, and transmission media. In various implementations, non-volatile media include optical, or magnetic disks, or solid-state drives, volatile media include dynamic memory, such as system memory component 514, and transmission media include coaxial cables, copper wire, and fiber optics, including wires that include bus 502. In an embodiment, the logic is encoded in non-transitory computer readable medium. Computer readable medium 517 may be any apparatus that can contain, store, communicate, propagate, or transport instructions that are used by or in connection with CPU 152. Computer readable medium 517 may be an electronic, magnetic, optical, electromagnetic, infrared, or semiconductor device or a propagation medium, or any other memory chip or cartridge, or any other medium from which a computer is adapted to read. In an example, transmission media may take the form of acoustic or light waves, such as those generated during radio wave, optical, and infrared data communications.

Although bus 502 is illustrated as being the path that delivers data between CPU 152 and GPU 154, this is not intended to be limiting and other embodiments using a different mechanism to deliver data between CPU 152 and GPU 154 are within the scope of the disclosure. In various embodiments of the present disclosure, execution of instruction sequences (e.g., method 400) to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims

What is claimed is:

1. A method of dynamically selecting content to display on a secondary display coupled to a user device, comprising:
    receiving a first set of image layers from a first application;
    determining whether to display a second set of image layers on the secondary display, the second set of image layers from a second application;
    allocating, at a kernel, a first frame buffer for first content to be output to a primary display, wherein the first content includes the first and second sets of image layers composited into the first frame buffer;
    in response to a determination to display the second set of image layers on the secondary display, displaying, on the secondary display, the first content stored in the first frame buffer; and
    in response to a determination to not display the second set of image layers on the secondary display:
        allocating, at the kernel, a second frame buffer for second content to be output to the secondary display, wherein the first set of image layers is stored in the second frame buffer; and
        displaying, on the secondary display, the second content stored in the second frame buffer and including the first set of image layers.

2. The method of claim 1,
    wherein the allocating a first frame buffer includes sending a request to composite the first and second sets of image layers into the first frame buffer.

3. The method of claim 1,
    wherein the allocating a second frame buffer includes sending a request to copy the first set of image layers but not the second set of image layers into the second frame buffer.

4. The method of claim 1, wherein the second content does not include the second set of image layers.

5. The method of claim 1,
    wherein the allocating a second frame buffer includes sending a request to composite the first and second sets of image layers into the second frame buffer, the method further comprising:
        removing, at the kernel, the second set of image layers from the second frame buffer in response to the determination to not display the second set of image layers on the secondary display.

6. The method of claim 1, wherein each image layer of the second set of image layers includes a display attribute, the method further comprising:
    determining, at the kernel, that the second set of image layers is to be displayed on the secondary display when the display attribute is set to a first value; and
    determining, at the kernel, that the second set of image layers is not to be displayed on the secondary display when the display attribute is set to a second value.

7. The method of claim 1, further comprising:
    receiving, at a display manager, the second set of image layers from the second application;
    determining, at the display manager, whether the second application is of a particular type;
    marking, at the display manager, the second set of image layers for non-display on the secondary display when the second application is of the particular type; and
    marking, at the display manager, the second set of image layers for display on the secondary display when the second application is not of the particular type.

8. The method of claim 7, wherein a communication application is of the particular type.

9. The method of claim 1, further comprising:
    allocating, at the kernel, a first audio buffer for a primary speaker coupled to the user device, wherein third content stored in the first audio buffer is output to the primary speaker;
    receiving a set of audio layers; and
    allocating, at the kernel, a second audio buffer for a secondary speaker coupled to the user device when the set of audio layers is to be output only to the primary speaker, wherein fourth content stored in the second audio buffer is output to the secondary speaker.

10. The method of claim 1, further comprising:
    determining to not display the second set of image layers on the secondary display.

11. The method of claim 1, further comprising:
    determining whether the second application is a communication application;
    in response to determining that the second application is a communication application, determining to not display the second set of image layers on the secondary display; and
    in response to determining that the second application is not a communication application, determining to display the second set of image layers on the secondary display.

12. The method of claim 1, further comprising:
displaying the first content on the primary display, wherein display of the first content on the primary display overlaps with display of the second content on the secondary display.

13. A system for dynamically selecting content to display on a secondary display coupled to a user device, comprising:
a display manager that receives a first set of image layers and determines whether to display a second set of image layers on the secondary display, wherein the first set of image layers is from a first application and the second set of image layers is from a second application;
a kernel that allocates a first frame buffer for content to be output to a primary display, wherein in response to a determination to not display the second set of image layers on the secondary display, the kernel allocates a second frame buffer corresponding to the secondary display, and wherein the first and second sets of image layers are composited into the first frame buffer, and the first set of image layers is stored in the second frame buffer; and
a display engine coupled to the secondary display, wherein in response to a determination to display the second set of image layers on the secondary display, the display engine displays the first and second sets of image layers stored in the first frame buffer on the secondary display, and wherein in response to a determination to not display the second set of image layers on the secondary display, the display engine displays the first set of image layers stored in the second frame buffer on the secondary display.

14. The system of claim 13, wherein the display manager sets a display attribute in the second set of image layers to a first value when the second application is of a particular type, and sets the display attribute to a second value when the second application is not of the particular type, and wherein an image layer from the second application of the particular type is not to be displayed on the secondary display.

15. The system of claim 13, wherein the primary and secondary displays have different viewing areas when the second set of image layers is not to be displayed on the secondary display.

16. The system of claim 14, wherein the second set of image layers is not displayed on the secondary device when the display attribute is set to the first value, and the second set of image layers is displayed on the secondary device when the display attribute is set to the second value.

17. The system of claim 13, further comprising:
an audio manager that receives a set of audio layers from the second application, wherein the audio manager sets an audio attribute in the set of audio layers to a second value when the set of audio layers is to be output only to a primary speaker coupled to the user device,
wherein the kernel allocates a first audio buffer for the primary speaker, wherein the kernel allocates a second audio buffer for a secondary speaker coupled to the user device when the audio attribute is set to the second value, and wherein content stored in the first audio buffer is output to the primary speaker and content stored in the second audio buffer is output to the secondary speaker.

18. The system of claim 13, wherein a time period in which the display engine displays content stored in the first frame buffer overlaps with a time period in which the display engine displays content stored in the second frame buffer.

19. A non-transitory computer-readable medium having stored thereon computer-executable instructions for performing operations, comprising:
receiving a first set of image layers from a first application;
determining whether to display a second set of image layers on the secondary display, the second set of image layers from a second application;
allocating, at a kernel, a first frame buffer for first content to be output to a primary display, wherein the first content includes the first and second sets of image layers composited into the first frame buffer;
in response to a determination to display the second set of image layers on the secondary display, displaying, on the secondary display, the first content stored in the first frame buffer; and
in response to a determination to not display the second set of image layers on the secondary display:
allocating, at the kernel, a second frame buffer for second content to be output to the secondary display, wherein the first set of image layers is stored in the second frame buffer; and
displaying, on the secondary display, the second content stored in the second frame buffer and including the first set of image layers.

20. The method of claim 10, wherein the second content is a subset of the first content.

* * * * *